(12) United States Patent
Stork et al.

(10) Patent No.: US 9,309,016 B2
(45) Date of Patent: Apr. 12, 2016

(54) AUTOMATIC CONTAINER ORIENTATION SYSTEMS AND METHODS

(71) Applicant: Stork Fabricators, Inc., Washington, MO (US)

(72) Inventors: Brian R. Stork, Washington, MO (US); Todd Rio, Union, MO (US)

(73) Assignee: Stork Fabricators, Inc., Washington, MO (US)

( * ) Notice: Subject to any disclaimer, the term of this patent is extended or adjusted under 35 U.S.C. 154(b) by 0 days.

(21) Appl. No.: 14/557,094

(22) Filed: Dec. 1, 2014

(65) Prior Publication Data

US 2015/0094849 A1 Apr. 2, 2015

Related U.S. Application Data

(63) Continuation of application No. 14/087,084, filed on Nov. 22, 2013, now Pat. No. 8,903,540.

(60) Provisional application No. 61/732,114, filed on Nov. 30, 2012.

(51) Int. Cl.
| | |
|---|---|
| *G06F 7/00* | (2006.01) |
| *G06F 19/00* | (2011.01) |
| *B65B 35/56* | (2006.01) |
| *B65B 57/10* | (2006.01) |
| *G05B 19/00* | (2006.01) |
| *B65G 47/244* | (2006.01) |
| *G06T 7/00* | (2006.01) |
| *B65B 35/58* | (2006.01) |
| *B65B 53/00* | (2006.01) |

(52) U.S. Cl.
CPC ........... *B65B 35/56* (2013.01); *B65B 35/58* (2013.01); *B65B 57/10* (2013.01); *B65G 47/244* (2013.01); *G05B 19/00* (2013.01); *G06T 7/001* (2013.01); *B65B 53/00* (2013.01); *B65B 2220/16* (2013.01); *G05B 2219/37555* (2013.01); *G05B 2219/42222* (2013.01); *G05B 2219/45048* (2013.01)

(58) Field of Classification Search
None
See application file for complete search history.

(56) References Cited

U.S. PATENT DOCUMENTS

| 6,201,203 | B1 * | 3/2001 | Tilles | B07C 3/008 209/540 |
|---|---|---|---|---|
| 6,622,767 | B2 | 9/2003 | Stork | |
| 6,854,242 | B2 | 2/2005 | Stork et al. | |
| 7,082,979 | B2 | 8/2006 | Stork | |
| 7,370,456 | B2 * | 5/2008 | Ichikawa | B65B 5/06 53/155 |
| 8,903,540 | B2 | 12/2014 | Stork et al. | |

* cited by examiner

*Primary Examiner* — Yolanda Cumbess
(74) *Attorney, Agent, or Firm* — Harness, Dickey & Pierce, P.L.C.

(57) ABSTRACT

According to various aspects, exemplary embodiments are disclosed of automatic container orientation systems. Also disclosed are methods for automatically orienting containers. In an exemplary embodiment, a system for automatically orienting containers generally includes one or more cameras, a controller, and an orientation unit. The one or more cameras are configured to obtain data relating to an orientation of at least one container to be included in a package. The controller is in communication with the one or more cameras for receiving the data and is configured to use the data to determine an amount of rotation needed for the at least one container to orient the at least one container in a desired final orientation. The orientation unit is configured to rotate the at least one container by the determined amount of rotation to thereby orient the at least one container in the desired final orientation.

18 Claims, 6 Drawing Sheets

AUTOMATIC CONTAINER ORIENTATION SYSTEMS AND METHODS

CROSS-REFERENCE TO RELATED APPLICATIONS

This application is a continuation of U.S. non-provisional patent application Ser. No. 14/087,084 filed Nov. 22, 2013 (issuing Dec. 2, 2014 as U.S. Pat. No. 8,903,540) which, in turn, claims the benefit of and priority to U.S. provisional patent application No. 61/732,114 filed Nov. 30, 2012. The entire disclosures of the above application are incorporated herein by reference.

FIELD

The present disclosure relates to automatic container orientation systems and methods.

BACKGROUND

This section provides background information related to the present disclosure which is not necessarily prior art.

Products are oftentimes sold in packages that include two more of the products. For better marketing appeal, the products are typically manually aligned so that the labels on the containers all face in the same direction before the products are shrink wrapped together as a package.

SUMMARY

This section provides a general summary of the disclosure, and is not a comprehensive disclosure of its full scope or all of its features.

According to various aspects, exemplary embodiments are disclosed of automatic container orientation systems. Also disclosed are methods for automatically orienting containers. In an exemplary embodiment, a system for automatically orienting containers generally includes one or more cameras, a controller, and an orientation unit. The one or more cameras are configured to obtain data relating to an orientation of at least one container to be included in a package. The controller is in communication with the one or more cameras for receiving the data and is configured to use the data to determine an amount of rotation needed for the at least one container to orient the at least one container in a desired final orientation. The orientation unit is configured to rotate the at least one container by the determined amount of rotation to thereby orient the at least one container in the desired final orientation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventors have developed and disclose herein exemplary embodiments of systems and methods for automatically orienting containers, such as cans (e.g., aerosol cans, etc.), bottles, jars, canisters, tubes, boxes, etc. As disclosed herein, containers are automatically oriented (e.g., individually spun or rotated, etc.) to a correction orientation (e.g., so that their labels are aligned and facing in the same direction, so that their UPC codes are hidden, etc.) before packaging (e.g., shrink wrapping, etc.) such that manual intervention is not required during the automatic orienting of the containers.

In an exemplary embodiment of the system, a multipack of vertically-oriented products in any position can be automatically arranged by spinning or rotating the individual products accordingly so that the labels of the products are aligned and all facing precisely in the same direction while standing upright before shrink wrapping. High speed camera technology is used to scan each item, product, or container as it enters the system. Camera data is transferred to a controller resulting in exact move information to obtain the desired final orientation. Servo-driven gripper wheels spin each container to this position resulting in precisely aligned labels for a strong point of sale visual presence. Advantageously, this also makes a very attractive and functional multipack. This system is also flexible enough to orient multiple UPC codes in a variety multipack. For example, the products can be spun to hide their UPC codes so that they are not scanned in as an individual product but as a multipack.

Figure 1:
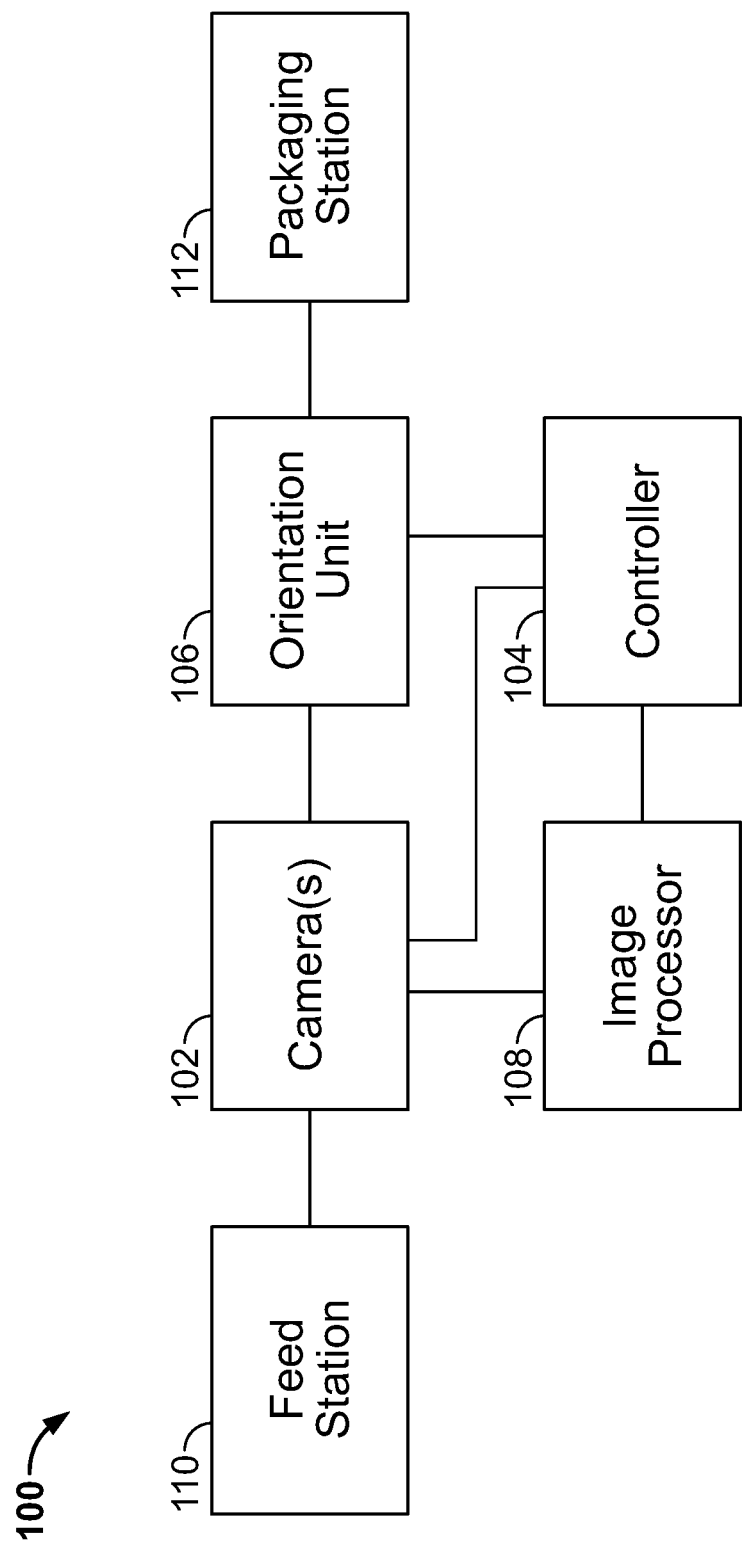
FIG. 1 is a block diagram of an automatic container orientation system according to an exemplary embodiment.

With reference now to the figures, FIG. 1 illustrates a block diagram of an automatic container orientation system 100 embodying one or more aspects of the present disclosure. As shown, the system 100 includes one or more cameras 102 configured to obtain data relating to an orientation of at least one container to be included in a package. The system 100 also includes a controller 104 in communication with the one or more cameras 102 for receiving the data. The controller 104 is configured to use the data to determine an amount of rotation needed for the at least one container to orient the at least one container in a desired final orientation. The system 100 also includes an orientation unit 106 configured to rotate the at least one container by the determined amount of rotation to thereby orient the at least one container in the desired final orientation.

The automatic container orientation system 100 may be designed to automatically orient a single container to be included in a package. The system 100 automatically orients the container so that the container has a desired final orientation in preparation for packaging. The desired orientation may be based on any suitable feature of the container, such as, for example, an indicator on the container, a shape of the container, etc. The indicator may be a label, a UPC symbol, etc. The indicator may be affixed to the container using adhesive, printed directly on the container, etched in the container surface, etc. For example, an indicator may be a label affixed to the container containing information about the contents of the container, such as a company logo or advertising illustrations for a product. Another example indicator is a UPC symbol printed directly on the container. If the exterior surface shape of the container is not uniform, the indicator may be a variation in the shape of the container exterior, such as, for example, a curve in the exterior surface, a flat portion of the exterior surface, a protrusion from the exterior surface, an indentation in the exterior surface, etc. Other example indicators include unique artwork, different colors, ultraviolet markings, text, etc.

The desired final orientation may be selected in advance by an operator of the automatic container orientation system 100. The operator may select the desired final orientation so that the container will be packaged with an indicator facing in a desired direction. For example, the desired final orientation may be selected so that an advertising label is facing forward when the container is packaged. In another example, the desired final orientation may be selected so that a UPC symbol is hidden when the container is packaged. The container may include more than one indicator, and the desired final orientation may be based on one or more indicators.

In some embodiments, the automatic container orientation system 100 may be configured to automatically orient multiple containers to be packaged together. For example, the system 100 may be configured to orient two containers together, so that both containers have indicators facing in the same direction. The system 100 may be configured to orient any suitable number of containers together for packaging (e.g., a package of three containers, four containers, etc.). The desired final orientation for the multiple containers includes a desired final orientation for each container individually. The desired final orientation may be selected so that an indicator on each container faces in the same direction, or so that an indicator on each container faces in a specific direction relative to the other container indicators. For example, the system 100 may orient three containers so that advertising labels on each container all face in the same direction (e.g., towards the front of the package, etc.). In another embodiment, the system 100 may orient three containers so that a UPC symbol on each container is hidden when the containers are packaged. The multiple containers may be automatically oriented substantially simultaneously such that all containers are rotated to the desired final orientation at the same time, or each container may be oriented separately and then combined with the other containers to form the desired final orientation before packaging.

The one or more cameras 102 may be any suitable camera(s) capable of capturing image data of the containers. In some embodiments, a dual camera system may be used to take a picture of each container individually. The camera(s) 102 may be high-speed camera(s) capable of capturing image data from containers moving past the camera(s) 102 at high speeds. A programmable logic controller (PLC) may be used to track the motion of the containers (e.g., by tracking lugs on a conveyor belt carrying the containers, using the diameter of each container, etc.) and determine when to signal the camera(s) 102 to strobe and capture image data for each container. The camera(s) 102 are configured to obtain data relating to the orientation of one or more indicators on each container. For example, the camera(s) 102 may capture image data showing the position of an advertising label on the container, the location of a UPC symbol, etc.

In some embodiments, the controller 104 may be included in the camera(s) 102, the orientation unit 106, or may be separate from both, such as, for example, included in a PLC, etc. The controller 104 may be configured to use the data relating to the orientation of the one or more indicators on each of the containers to determine an amount of rotation needed for each of the containers so that the one or more indicators on each of the containers are aligned and facing in a same direction. For example, the controller 104 may receive image data from the camera(s) 102, process the image data to determine an initial orientation of a label on the container, and determine an amount of rotation necessary to rotate the container so that the label is facing forward for packaging. The controller 104 may send the determined rotation information to the orientation unit 106, or may control the orientation unit 106 directly to rotate the container by the determined amount.

In some embodiments, the system may include an image processor 108 in communication with the camera(s) 102 and the controller 104. The image processor 108 may be included in the camera(s) 102, included in the controller 104, included in the orientation unit 106, or may be separate, such as, for example, included in a PLC, etc. The image processor 108 may be configured to compare image data captured by the camera(s) 102 with a library of image data relating to the orientation of one of the containers to determine an initial orientation of each of the containers. The library of image data may be stored in a memory located in the image processor 108, the camera(s) 102, the controller 104, the orientation unit 106, a PLC, a remote computer system, a remote server, etc. The library of image data may be generated by an operator taking images of a container prior to operation of the system 100, receiving image data from a manufacturer of the containers or products inside the containers, etc. The library of image data generally includes one or more images of a container for comparison against data captured by the camera(s) 102 to determine an orientation of the container during operation of the system. For example, the library of image data may include a series of multiple container sector images, each sector image representing a view of the container taken from a different segment of a circumference of the container. In one example embodiment, the library of data may include a series of ten photographs, each representing a consecutive thirty-six degree segment surrounding the circumference of the container. The series of sector images may completely cover the circumference of the container, or may only cover a portion of the container. The series of sector images may be consecutive or non-consecutive.

The image processor 108 may be configured to process and compare the captured image data from the camera(s) 102 to the series of images from the library of image data to determine which sector is matched by the captured image data. That information can then be transmitted to the controller 104, orientation unit 106, a PLC, etc., and may be loaded into a memory array. The image processor 108 may be configured to determine a sector number of the matched image data and a degree offset representing the difference in degrees of rotation between the captured image data and the matched sector number image from the library of image data. The sector number and degree offset amount can be communicated to indicate an amount of rotation necessary to orient each container in the desired final orientation. The image processor 108 may also indicate which camera captured the matched image (if there is more than one camera), and whether a camera found a match at all. For example, the image processor 108 may receive captured image data from two cameras, compare them to a series of ten sector images, and determine that an image from the second camera matched the fourth image in the series of library image data but was offset by seven degrees. The image processor 108 could then indicate that sector four was matched with a seven degree offset amount, that the second camera captured the matched image, and that a match was found.

The orientation unit 106 may include a rotating device for each of the containers to be packaged together, such that each of the containers can be rotated individually. The rotating device may be any device suitable for contacting the containers and causing them to rotate to a desired orientation, such as, for example, a wheel, a rotating disc, a servomotor driven wheel, a gripper wheel, a rotating clamp, rotating claw, a rotating magnet, a rotating suction cup, clamping wheels, etc. In some embodiments, the orientation unit 106 may include wheels for rotating the containers and a carriage supporting the wheels, the carriage configured to move the wheels into contact with the containers to thereby orient each of the containers in the desired final orientation.

In some embodiments, the system 100 may include a feed station 110. The feed station 110 may be configured to receive containers from a container source and place the containers on a conveyor system for moving containers to different portions of the automatic container orientation system 100. The container source could be another automated unit that moves containers to the feed station 110 or takes containers out of boxes and deposits them in the feed station 110, a conveyor belt carrying containers to the feed station 110, a funnel system in which containers are deposited and filtered down to the feed station 110, etc. In some embodiments, the feed station 110 may be either a dual or single screw feed. The feed station 110 may either include a single stream of containers, or may combine two or more streams of containers into a single feed. The screw feed may be servomotor controlled and may straddle a conveyor equipped with lugs, fingers, etc., spaced out at consistent intervals. The lug may be straddled by two conveyor belts that move at the same speed as the lug. In some embodiments, the conveyor belts may be two inches wide. In other embodiments, a single conveyor may be used with lugs placed on either side of the conveyor. The containers may be carried by the belt(s) with the lug right behind them. The feed station 110 may be configured to deposit the number of containers to be packaged together on the same lug. For example, if the operator wants to package two containers together, the feed station 110 may deposit two containers per lug. Alternative embodiments may include other systems, means, or methods for feeding containers, such as a star wheel feeder, a toggle clamp feeder, a pressure belt feeder, a cogged chain feeder, a lug chain feeder, a paddle feeder, etc.

The system 100 may also include a packaging station 112. The packaging station 112 may be configured to package the containers while maintaining a desired final orientation of each of the containers. In some embodiments, the packaging station 112 may be configured to package the at least one container by shrink wrapping a film around at least a portion of the at least one container, and may be a vertical shrink wrapping packager. In other embodiments, the packaging station 112 may package containers using other suitable packaging methods that allow at least a portion of the containers to be viewed while the containers are in the packaging. For example, the packaging station 112 may include a cardboard insert inside the shrink wrap film to partially cover a portion of the containers and provide additional advertising and product information. Alternative embodiments may include other means or methods for packing containers. For example, the packaging may be in a formed tray or case, a store display case, a bundled multipack, a glued together multi pack, a label affixed to hold the members of the package, etc.

Although FIG. 1 illustrates an automatic container orientation system 100 having a feed station 110, packaging station 112, and image processor 108, it is understood that alternative embodiments may not include one or more of the feed station 110, packaging station 112 and image processor 108.

Figure 2:
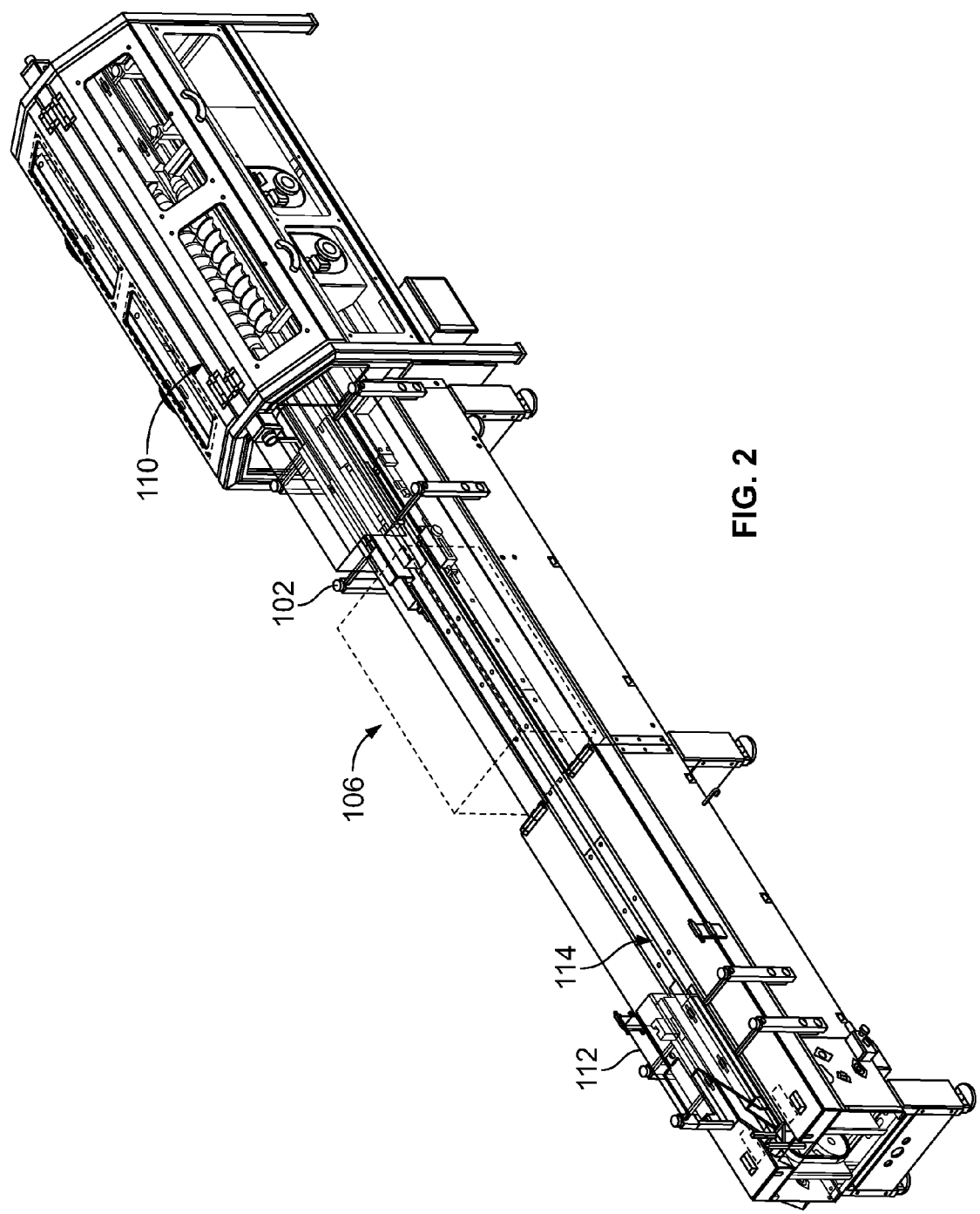
FIG. 2 is a perspective view of an exemplary automatic container orientation system according to the exemplary embodiment shown in FIG. 1, where the orientation unit is not illustrated for clarity.

FIG. 2 is a perspective view of the exemplary automatic container orientation system 100. The feed station 110 is a screw feed that delivers containers into a lug. The lugs are spaced apart by a distance sufficient to separate groups of containers, but still maintain efficiency of the automatic container orientation system. In some embodiments, the lugs are spaced about fifteen inches apart. The lugs are also tall enough to support the containers as the containers move with the lugs. A conveyor system 114 includes a conveyor belt split into two and straddling the lug. Although FIG. 2 illustrates a conveyor belt and lugs for moving containers between the stations of the automatic container orientation system 100, it should be understood that other conveyor systems could be used. In other embodiments, the conveyer system 114 may include a rotating table that moves containers from station to station, a pick and place system that lifts containers from one station and deposits them at another station, etc. The conveyor system 114 may be configured to contact the containers to move them from the feed station 110 to the orientation station 106, and from the orientation station to the packaging station 112.

The conveyor system 114 moves the containers from the feed station 110, past one or more cameras 102, and to the orientation unit 106. The orientation unit 106 may fit over the conveyor system. The orientation unit 106 is not illustrated in detail in FIG. 2 for clarity, although its location is identified. The orientation unit 106 orients the containers in a desired final orientation. In some example embodiments, the containers may be rotated on the split belt around the lug, to preserve the orientation and prevent (or at least inhibit) accidental rotation from resistance of a fixed conveyor deck. After the containers leave the orientation unit 106, conveyor system 114 moves the containers to the packaging station 112. In some embodiments, the split conveyor belt may end just before the containers are delivered to the packaging station. The packaging station 112 may be a wrapper film tube configured to preserve the orientation of the containers until the containers are packaged in shrink film. After the shrink film shrinks to package the containers, the package may be delivered to customers while preserving the desired final orientation (e.g., labels facing forward, etc.) to allow for improved marketing appeal while displayed for sale on a store shelf.

Figure 3:
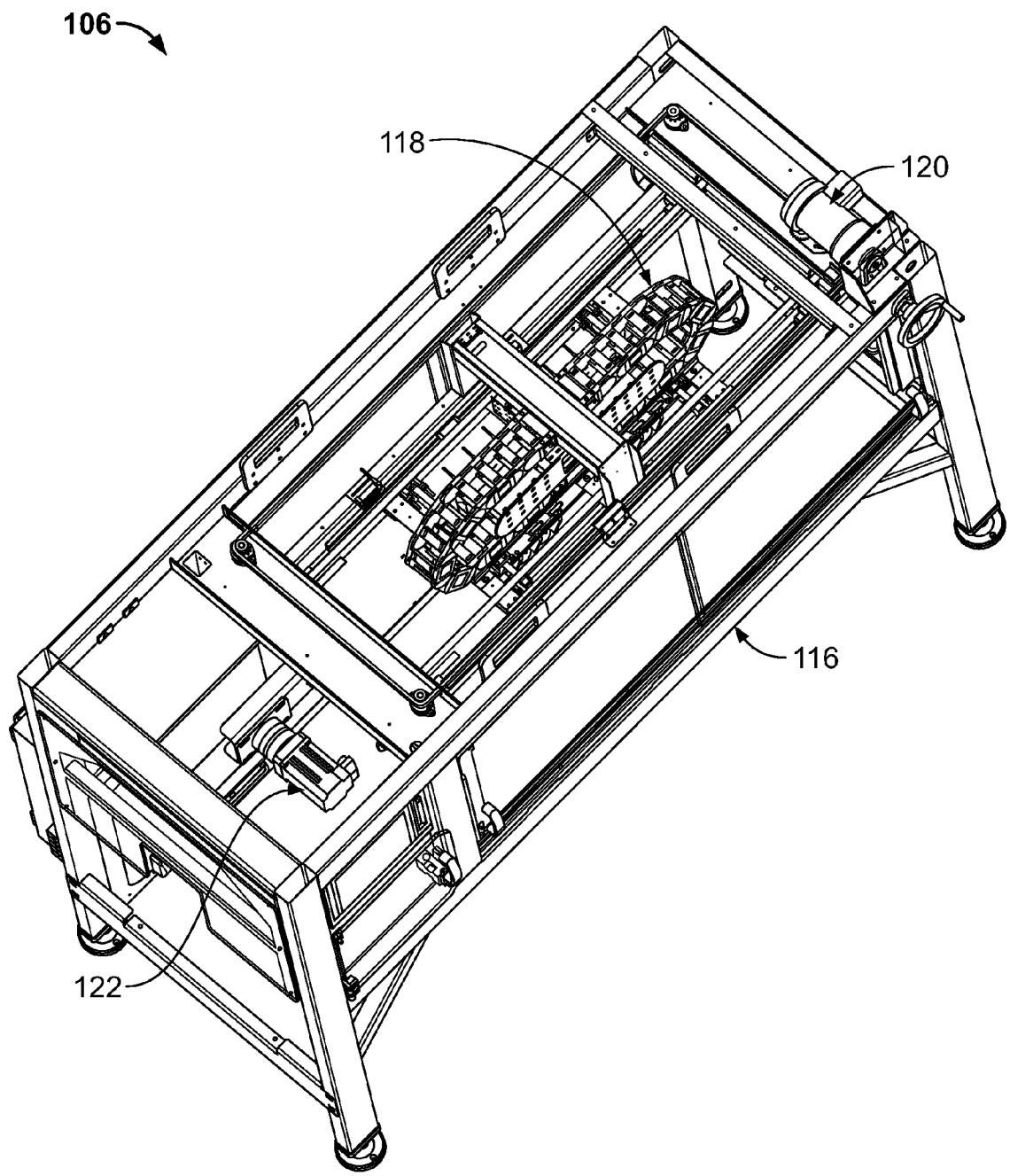
FIG. 3 is a perspective view of an exemplary orientation unit of the exemplary automatic container orientation system shown in FIG. 1.

FIG. 3 is a perspective view of an exemplary orientation unit 106 of the automatic container orientation system shown in FIG. 1. The orientation unit 106 may be inserted over the conveyor system shown in FIG. 2. In this example embodiment, the orientation unit 106 includes a frame 116 which houses a carriage 118. The carriage 118 may be configured to run on bearing rails in the orientation unit 106. A vertical positioning motor 120 can be used to adjust the vertical position of the carriage 118 for different container heights. A carriage motion servomotor 122 may be used to move the carriage 118 horizontally to match the speed and position of containers as they move through the orientation unit 106. The carriage 118 may include a rotating device (e.g., gripper wheels, spinners, etc.) configured to contact the containers to orient them from an initial orientation to the desired final orientation. In some embodiments, the carriage 118 may be configured to orient the containers while they are in motion on the conveyor system 114. The carriage 118 can move along with the containers as the containers are being oriented, rotate the containers to a desired final orientation, and then return to a home position to wait for the next group of containers. In other embodiments, the containers may come to a stop for orientation by the orientation unit 106, and the orientation unit 106 may not be configured to move with the containers.

Figure 4:
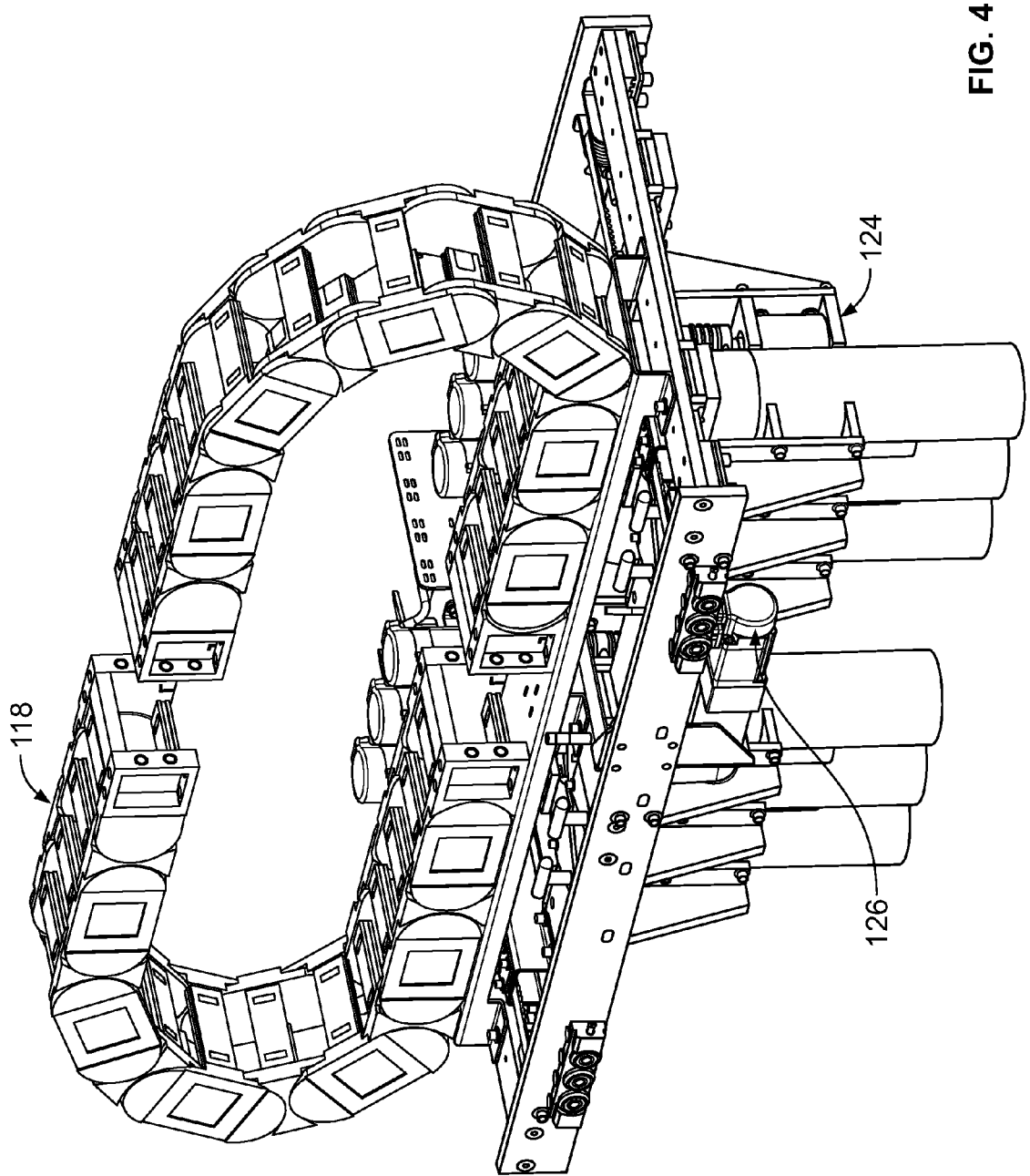
FIG. 4 is a perspective view of a portion of the exemplary orientation unit shown in FIG. 3.

FIG. 4 is a perspective view of a portion of the exemplary orientation unit 106 shown in FIG. 3, and illustrates a carriage 118 and rotating device 124 of the orientation unit. The carriage includes a squeeze servomotor 126 configured to cause the rotating device 124 to contact the containers for orienting the containers. In this example embodiment, the rotating device 124 is a gripper wheel including a spinner driven by a servomotor and backup rollers to assist in holding the containers in place while they are oriented by the servomotor driven spinners. In this embodiment, containers are transported by the conveyor system 114 underneath the carriage 118. The carriage 118 attaches itself to the containers by squeezing the set of gripper wheels together around each container. The squeeze servomotor 126 causes the servomotor driven spinner and the backup roller to move together from an expanded position to a closed position which contacts each container. Each container is then oriented individually to the desired final orientation (e.g., label facing forwards, UPC symbol hidden, etc.) as each container moves underneath the carriage 118. The carriage 118 can be equipped with any number of axes to rotate the containers in the lug(s). In this embodiment, the automatic container orientation system 100 is configured to orient containers in groups of three to be packaged together. The carriage 118 includes six servomotor driven spinners capable of orienting two groups of three-packs at once. In other embodiments, the carriage 118 may be configured to orient only one group of containers at one time, or to orient more than two groups of containers at one time. Although FIG. 4 illustrates three containers per group, other embodiments could include more or less containers in each group for packaging. The carriage 118 can be adjusted to include the appropriate number and location of rotating devices to orient the containers according to the desired number of containers per packaging group.

Figure 5:
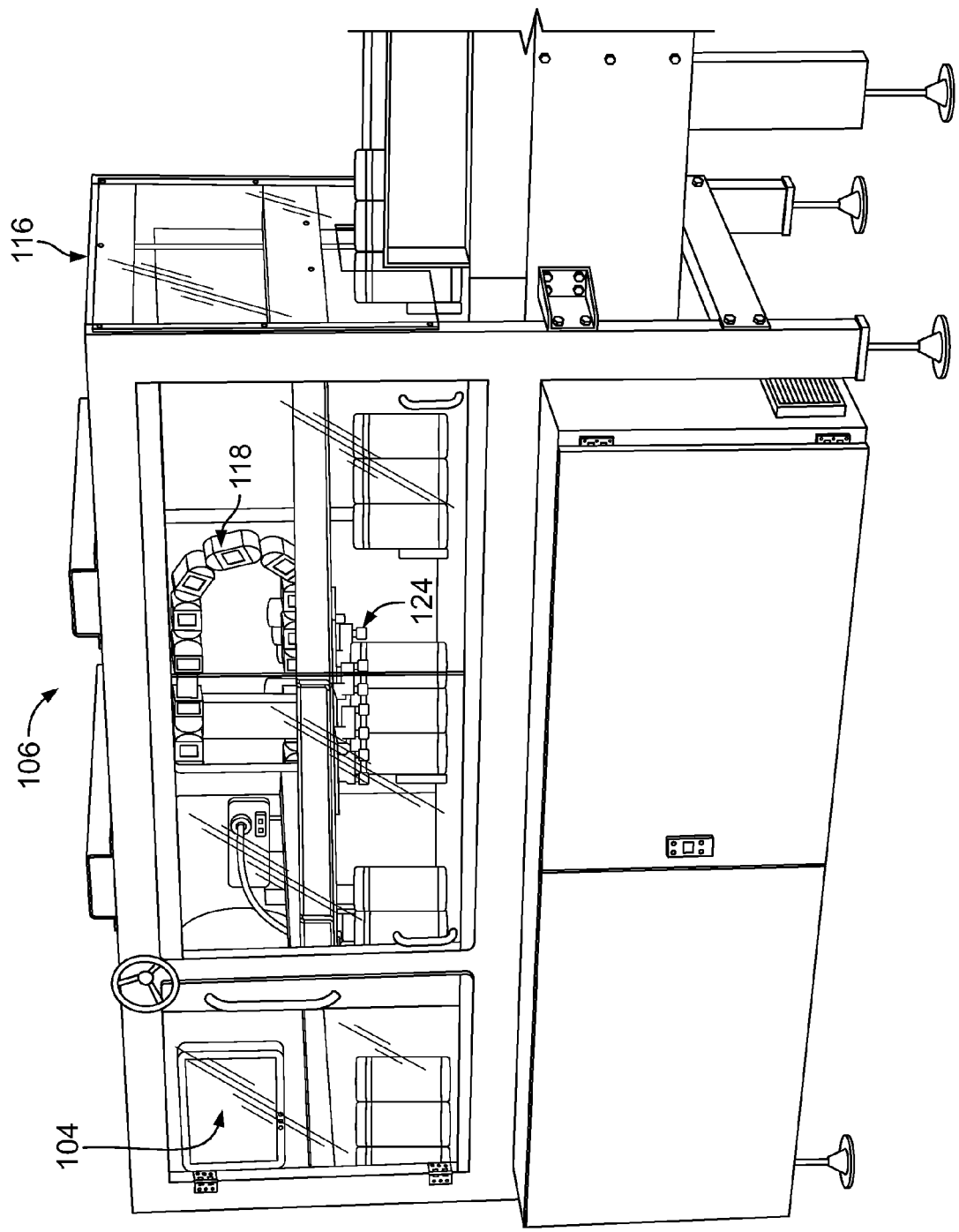
FIG. 5 is another perspective view of the exemplary orientation unit shown in FIG. 3 shown with a controller.

FIG. 5 illustrates another perspective view of the exemplary orientation unit 106 shown in FIG. 3, shown with a controller 104. The orientation unit 106 is illustrated showing the orientation unit frame 116, a controller 104, a carriage 118, and a set of rotating devices 124. The controller 104 may be any suitable controlling device capable of operating aspects of the orientation unit 106, such as, for example, a programmable logic controller (PLC). The controller 104 may be used by an operator to adjust settings of the orientation unit 106, such as, for example, the height of the carriage 118 and rotating devices 124, the speed of the of the carriage 118, the home position of the carriage 118, the number of rotation devices 124 based on the number of containers per group, the squeeze position of the rotating devices 124 based on the size of the containers, etc.

Figure 6:
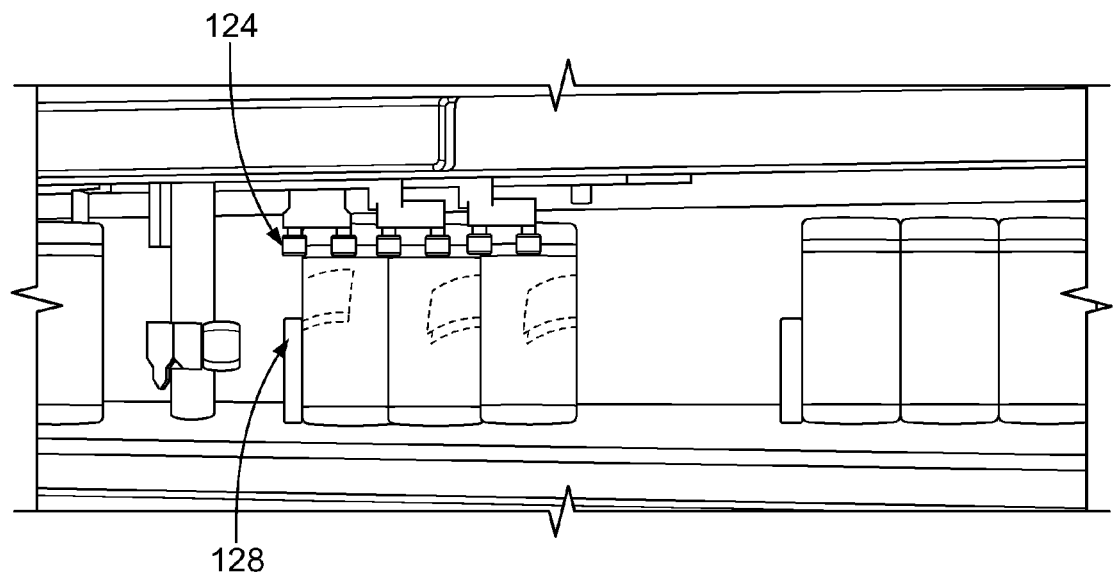
FIG. 6 is a close up perspective view of a portion of the exemplary orientation unit shown in FIG. 3, before a plurality of containers have been rotated to a desired final orientation.

FIG. 6 is a close up perspective view of a portion of the exemplary orientation unit 106 shown in FIG. 3, before a plurality of containers have been rotated to a desired final orientation. FIG. 6 illustrates a set of rotating devices 124 supported by a carriage 118 (FIGS. 3-5) after they have contacted a group of three containers. The containers are moving along a conveyor system 114 (FIG. 2) as pushed from behind by a lug 128. The containers have not yet been oriented to the desired final orientation because the labels are not facing in the same direction. In this embodiment, the rotating devices 124 consist of two servomotor driven spinner wheels in contact with each container.

Figure 7:
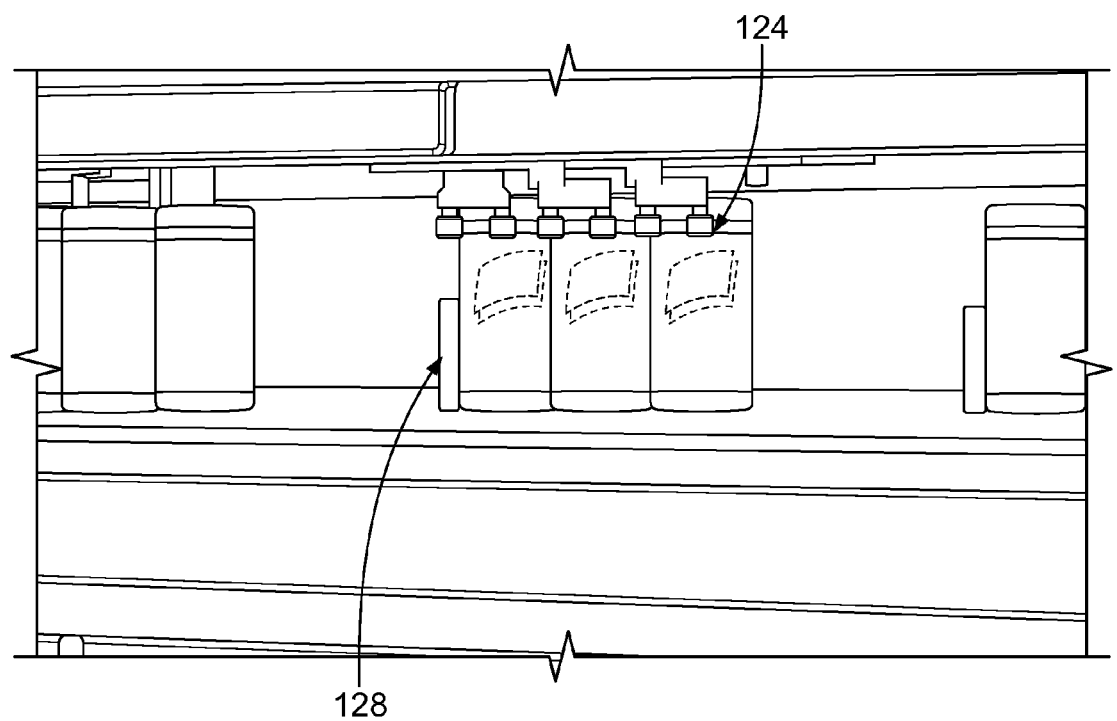
FIG. 7 is a close up perspective view of the portion of the exemplary orientation unit shown in FIG. 6, after the plurality of containers have been rotated to a desired final orientation.

FIG. 7 is a close up perspective view of the portion of the exemplary orientation unit 106 shown in FIG. 6, after the plurality of containers have been rotated to a desired final orientation. The carriage 118 (FIGS. 3-5) and rotating devices have moved along the conveyor system 114 (FIG. 2) while being pushed by the lug 128 from an initial container contacting position shown in FIG. 6, to a desired final orientation position shown in FIG. 7. As the containers moved along the conveyor system 114 the rotating devices 124 rotated each container individually to the desired final orientation. As shown in FIG. 7, the desired final orientation in this embodiment includes the labels of all containers facing outwards in the same direction.

According to another example embodiment, a method for automatically orienting containers in a desired final orientation for packaging is disclosed. The method includes obtaining data relating to an orientation of at least one container to be included in a package, transferring the data to a controller and determining an amount of rotation for the at least one container needed to orient the at least one container in a desired final orientation, and rotating the at least one container by the determined amount of rotation to thereby orient the at least one container in the desired final orientation.

According to another example embodiment, a system for automatically orienting containers in a desired final orientation for packaging includes a conveyor system, a feed station, an orientation unit, and a packaging station. The feed station is configured to receive at least one container from a container source and place the at least one container on the conveyor system. The orientation unit is configured to obtain data relating to an orientation of the at least one container, determine an amount of rotation needed for the at least one container to orient the at least one container in a desired final orientation, and rotate the at least one container by the amount of rotation determined for the at least one container to thereby orient the at least one container in the desired final orientation. The packaging station is configured to package the at least one container while maintaining the desired final orientation of the at least one container. The conveyor system is configured to move the at least one container from the feed station to the orientation station, and from the orientation station to the packaging station.

Advantageously, the orientation systems and methods disclosed herein may allow for the cost-saving advantages of vertical wrapping. With the technology disclosed herein, different products that are filled upright such as tubes, bottles, canisters, cans, jars, etc. can be filled and wrapped via a single operation performed by a single system. This, in turn, allows for eliminating the traditional costs associated with packing products off to a co-packer for multipack assembly and wrapping.

By way of example, an automatic container orientation system disclosed herein may be used in combination with a vertical shrink wrapping system, such as the 914 Orbital Vertical System (OVS) from Stork Fabricators, Inc. and as described at their website www.texwrap.com, the contents of which are incorporated herein by reference. By way of background, a vertical shrink wrapping system may automatically wrap multipacks of products such as bottles, cans, jars, canisters, etc. directly from the fillers with the product standing upright and all labels facing in the desired direction. When the inventor's disclosed automatic container orientation system is combined or used in conjunction with a vertical wrapping system, there is no need to manually orient the products, which thus allows the containers to go directly from filling to wrapping to cartoning to distribution in-line, without interruption.

The automatic orientation can be used to orient product labels for increased shelf appeal, and can be used to hide individual unit bar codes within a container multipack. The package can then be labeled or wrapped with printed film for identification in a store as a multipack. In some embodiments, the system is capable of combining multiple UPC codes of the same item in to a variety pack, and may be capable of orienting up to seventy-five to eighty three-container packs a minute.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for automatically orienting containers, the system comprising:
   one or more cameras configured to obtain data relating to an orientation of one or more indicators on at least one container to be included in a package;
   a controller in communication with the one or more cameras for receiving the data, the controller configured to use the data to determine an amount of rotation needed for the at least one container to orient the at least one container in a desired final orientation; and
   an orientation unit configured to rotate the at least one container by the determined amount of rotation to thereby orient the at least one container in the desired final orientation.

2. The system of claim 1, wherein the at least one container comprises multiple containers to be included together in a package.

3. The system of claim 2, wherein the multiple containers comprise at least three containers to be included together in a package.

4. The system of claim 2, wherein the orientation unit comprises a rotating device for each of the containers to be packaged together, such that each of the containers can be rotated individually.

5. The system of claim 1, wherein the controller is configured to use the data relating to the orientation of the one or more indicators on the at least one container to determine an amount of rotation needed for the at least one container so that the one or more indicators on the at least one container are aligned and facing in a same direction as one or more indicators on at least one other container.

6. The system of claim 1, further comprising:
   a feed station;
   a packaging station; and
   a conveyor system configured to move containers from the feed station to the one or more cameras, from the one or more cameras to the orientation unit, and from the orientation unit to the packaging station;
   wherein the feed station is configured to receive containers from a container source and place the containers on the conveyor system, and the packaging station is configured to package the containers while maintaining the desired final orientation of each of the containers.

7. A system for automatically orienting containers, the system comprising:
   one or more cameras configured to obtain data relating to an orientation of at least one container to be included in a package;
   a controller in communication with the one or more cameras for receiving the data, the controller configured to use the data to determine an amount of rotation needed for the at least one container to orient the at least one container in a desired final orientation;
   an orientation unit configured to rotate the at least one container by the determined amount of rotation to thereby orient the at least one container in the desired final orientation; and
   an image processor in communication with the one or more cameras and the controller, the image processor configured to compare image data captured by the one or more cameras with a library of image data relating to container orientation.

8. The system of claim 7, wherein the one or more cameras are configured to obtain data relating to an orientation of one or more indicators on the at least one container.

9. A system for automatically orienting containers, the system comprising:
   one or more cameras configured to obtain data relating to an orientation of at least one container to be included in a package;
   a controller in communication with the one or more cameras for receiving the data, the controller configured to use the data to determine an amount of rotation needed for the at least one container to orient the at least one container in a desired final orientation;
   an orientation unit configured to rotate the at least one container by the determined amount of rotation to thereby orient the at least one container in the desired final orientation; and
   an image processor in communication with the one or more cameras and the controller, the image processor configured to compare image data captured by the one or more cameras with a library of image data relating to orientation of one of multiple containers to determine an initial orientation of each of the containers.

10. The system of claim 9, wherein the library of image data comprises a series of multiple container sector images, each sector image representing a view of one of the containers taken from a different segment of a circumference of the container, the image processor configured to communicate a sector image number and a degree offset amount within the sector image to the controller for each of the containers, thereby indicating an amount of rotation necessary to orient each of the containers in the desired final orientation.

11. A system for automatically orienting containers, the system comprising:
   one or more cameras configured to obtain data relating to an orientation of at least one container to be included in a package;
   a controller in communication with the one or more cameras for receiving the data, the controller configured to use the data to determine an amount of rotation needed for the at least one container to orient the at least one container in a desired final orientation; and
   an orientation unit configured to rotate the at least one container by the determined amount of rotation to thereby orient the at least one container in the desired final orientation;
   wherein the orientation unit includes wheels for rotating containers and a carriage supporting the wheels, the carriage configured to move the wheels into contact with the containers to thereby orient each of the containers in the desired final orientation.

12. A method for automatically orienting containers in a desired final orientation for packaging, the method comprising:
   obtaining data relating to an orientation of one or more indicators on at least one container to be included in a package;
   transferring the data to a controller and determining an amount of rotation for the at least one container needed to orient the one or more indicators on the at least one container so that the one or more indicators on the at least one container are aligned and facing in a same direction as one or more indicators on at least one other container; and
   rotating the at least one container by the determined amount of rotation for the at least one container such that the one or more indicators on the at least one container are aligned and facing in the same direction as the one or more indicators on the at least one other container.

13. The method of claim 12, wherein the at least one container comprises multiple containers to be included together in a package.

14. The method of claim 13, wherein the multiple containers comprise at least three containers to be included together in a package.

15. The method of claim 12, further comprising:
feeding containers from a container source to a conveyor;
moving the containers on the conveyor to a camera to obtain the data relating to the orientation of each of the containers;
moving the containers from the camera to an orientation unit to rotate each of the containers; and
packaging the containers while maintaining each of the containers in the desired final orientation.

16. A method for automatically orienting containers in a desired final orientation for packaging, the method comprising:
obtaining data relating to an orientation of at least one container to be included in a package;
transferring the data to a controller and determining an amount of rotation for the at least one container needed to orient the at least one container in a desired final orientation; and
rotating the at least one container by the determined amount of rotation to thereby orient the at least one container in the desired final orientation;
wherein obtaining data includes receiving image data captured by one or more cameras relating to the orientation of the at least one container, the method further comprising:
comparing the image data captured by the one or more cameras with a library of image data relating to the orientation of the at least one container, the library of image data comprising a series of multiple container sector images, each sector image representing a view of a container taken from a different segment of a circumference of the container;
determining an initial orientation of the at least one container; and
communicating a sector image number and a degree offset amount within the sector image to the controller for the at least one container, thereby indicating an amount of rotation necessary to orient the at least one container in the desired final orientation.

17. A system for automatically orienting containers in a desired final orientation for packaging, the system comprising:
a conveyor system;
a feed station configured to receive at least one container from a container source and place the at least one container on the conveyor system; and
an orientation unit configured to obtain data relating to an orientation of the at least one container, determine an amount of rotation needed for the at least one container to orient the at least one container in a desired final orientation, and rotate the at least one container by the amount of rotation determined for the at least one container to thereby orient the at least one container in the desired final orientation; and
a packaging station configured to package the at least one container while maintaining the desired final orientation of the at least one container;
wherein the conveyor system is configured to move the at least one container from the feed station to the orientation unit, and from the orientation unit to the packaging station; and
wherein:
the feed station includes at least one screw feed controlled by a servomotor; and
the conveyor system includes at least two conveyor belts and at least one lug, the at least two conveyor belts and at least one lug configured to contact the at least one container to move the at least one container from the feed station to the orientation unit, and from the orientation unit to the packaging station.

18. The system of claim 17, wherein the packaging station is configured to package the at least one container by shrink wrapping a film around at least a portion of the at least one container.

* * * * *